UNITED STATES PATENT OFFICE.

WILLIAM J. TAYLOR, OF HIGH BRIDGE, NEW JERSEY.

IMPROVEMENT IN THE MANUFACTURE OF IRON.

Specification forming part of Letters Patent No. 145,461, dated December 9, 1873; application filed December 5, 1873.

CASE A.

*To all whom it may concern:*

Be it known that I, WILLIAM J. TAYLOR, of High Bridge, in the county of Hunterdon and State of New Jersey, have invented certain new and useful Improvements in the Manufacture of Iron, of which the following is a specification:

This invention relates to the manufacture of metallic iron from the oxides of that metal.

Iron ore, fine or made fine, has been consolidated with various materials, in various ways, and for different purposes. Prominent among these attempts to utilize pulverized ores are those of the English and American patents of A. L. Fleury; and by Lang and Fry, L. S. Goodrich, and H. L. Lucas, of the United States; and Breché, Viger, and Averill, of Canada, as described in the patents granted to them, respectively.

In the patents of Fleury the object is to utilize various kinds of cinders by pulverizing them and mixing with pulverized silicious ores, and consolidating them by the use of lime, &c., more particularly for use in a puddling-furnace, for reduction and conversion into wrought-iron or steel; and that silicious ores may be treated in the same manner. In all this there is an absolute absence and want of perfect control over the product, and there is no magnetic separation of iron oxides from the impurities.

Lang and Fry consolidate pulverized scoriæ (cinders) or ore, or sand ore, with lime and pulverized carbon, for reduction in a smelting-furnace, the object being to utilize cinders and sand ores for the purpose of economical conversion into some kind of iron, varying according to the impurities of the ore and cinders; but, in this, it will be seen that there is no conception of the invention of controlling the quality of the iron by controlling the character of the product prior to its use in the furnace.

Goodrich, also, has a consolidation, in which pulverized burnt ore, carbon, lime, nitrate of soda, and molasses form the elements, and in which the process aims at the direct process of conversion into wrought-iron by the puddling-furnace. No such thing is desired by my process.

Lucas consolidates peat with pulverized ores, fine coal, and a flux, the chief object of which being the utilization of raw peat as a fuel; but the superabundance of phosphates in peat would defeat the object of my invention, to say nothing of the features which distinguish my process from that of Lucas, while Breché, Viger, and Averill, like all others, treat the ore in as purified a native state as they can get it without magnetic separation; but in their process the production of cast-steel at one operation, in a crucible or a reverberatory or other suitable furnace, is the object and purpose of their invention, in carrying out which they employ a compound of pulverized plumbago, anthracite or bituminous coal, or coke, compressed into suitable forms, or used in a loose state, with pulverized iron ores or iron sand, and with wrought-iron, scrap iron, iron shavings, &c., all for conversion direct into cast-steel, and without any separation of the magnetic iron oxides from their impurities by magnetic influence, and differing essentially from my process of making a superior quality of cast-iron, suitable for conversion into bessemer-steel direct from the smelting-furnace to the bessemer-converter, by first extracting the oxides, and thus determining beforehand what the product from the furnace will be. The state of the art, as far as I know, does not show that this previous perfect control of the product has ever been obtained.

In the production of cast-iron, commercially known as "pig-iron," in a blast-furnace, as hitherto practiced, the raw material has been reduced directly and entirely in its native state, no mechanical means having been employed to extract the oxides of iron from the impurities of the native ores. The consequence is, that the ever-changing character and quality of the native ores has rendered the product of the blast-furnace, in a great measure, beyond control; because, at one time the ores will contain too much phosphorus or silica, rendering the iron cold-short in its nature; at another time an excess of sulphur may predominate, and render the iron red-short.

It is a fact well known to those skilled in the manufacture of iron, that there is but comparatively little ore in its native state, in this country, sufficiently low in phosphorus to make iron suitable for conversion into bessemer-steel. This great disadvantage is entirely obviated by my invention, wherein the quantity of phosphorus in the oxide of iron is brought entirely within the limit, so that the iron produced from it is low enough in this element to make bessemer-steel, without particular reference to the quality of the iron ore in its native state.

The distinguishing feature of my invention consists in controlling the products of the blast or other suitable furnace, by controlling the character of the material fed to the furnace, by treating such material as a preliminary step to its reduction to cast-iron; such treatment being, first, the reduction of the iron ore to a fine or powdered state, if not naturally found in such condition; and, secondly, the separation or extraction of the oxides of iron from the earthy matter or impurities; and, third, in the mechanical consolidation into lumps of the oxides, thus separated and rendered comparatively pure, such consolidation being effected by the use of lime and water, or anything else that will produce the desired result. I prefer, however, the material mentioned, chiefly on account of its answering the purpose of a flux in the blast-furnace, and because of its cheapness for the purpose, and the readiness with which it unites and holds the fine oxides, making the powder in effect a solid lump, sufficiently hard and tenacious to resist crumbling, but which will readily yield to the action of the furnace. This is a very important matter in the treatment of pulverized oxides of iron, and the combination thereof into solid lumps, which also constitute the flux for the furnace, is of great advantage in various ways, one of which is a thorough and perfect mixture of the fluxing material with the iron oxides, as each lump of material carries with it its own mechanically-combined fluxing material, not only thoroughly mixed, but in the proportions, as near as possible, required, and thereby save much trouble in the distinct and separate introduction of the iron oxides and the fluxing material into the furnace. If, however, the quantity of lime employed to effect the proper combination and consolidation of the iron oxides should be found, in practice, to be not sufficient for the purpose of fluxing, it will be a very easy matter to introduce additional fluxing material in the furnace; but even in this contingency the fluxing material used in the consolidation will be of great advantage in the working of the furnace.

It may be stated just here, that it is the aim and design of my invention to reverse the order in the treatment of ore for the production of iron, such reversion consisting in dealing with and preparing the iron ore before its subjection to the furnace, and in this way, and by this means, determine absolutely the character of the iron to be produced, instead of relying upon the ore in its native state, and the furnace, to determine these highly-important things.

It will be understood that the ores to be treated by my process are of the character known as magnetic oxides, and the extraction of the oxides of iron, after having been made fine or pulverized, is effected by the use of any of the well-known magnetic separators; while the previous reduction of the magnetic ores to a suitable fineness, may be effected by any proper crushing or pulverizing machinery. Wherever the magnetic oxides of iron may be found naturally fine enough for separation, no crushing or pulverizing is necessary; and in this way all fine magnetic ores can be treated for use in a blast-furnace for reduction to cast-iron, whereas such magnetic or any fine or powdered ores cannot be used in a blast-furnace on account of their tendency to constantly choke the furnace, pass off in and fill up the gas-flues; and, indeed, I may say that fine ores are almost useless as an element of value in the manufacture of cast-iron in a blast-furnace; but, when separated from their impurities, and combined and consolidated into a compound of both iron and a material for a flux, the article assumes a new and distinctive character, both in its composite nature and as an article of commerce in the iron trade, being a prepared article almost entirely freed from its natural impurities, easily and conveniently handled, and altogether a new and saleable thing, fully and almost entirely controllable as regards the character of the iron to be produced from it. The new material consolidated is easily distinguished and known from the crude article by its appearance, and it is made in the same manner as mortar, with water, and formed into masses and lumps suitable for use.

The proper proportions of lime to the separated oxides of iron I have found to be from five to ten per cent.; but this, of course, may be varied, as may be found necessary in practice. I have mentioned lime as the best for use in the consolidation of the oxides of iron, and have so far found it the best adapted for the purpose, because it unites the grains of oxides of iron into a solid mass when dried, the same as it unites sand in mortar, and at the same time forms the best-known flux.

In the consolidation of the material as described, any other substance or material that it may be desirable to carry into the iron to be produced for a specific purpose may be used, according to the character of the iron to be produced, in carrying out my invention.

In the process of manufacturing cast-iron, as herein described, it will of course be understood that I employ what is known as the blast or cupola furnace, of any suitable size and form, for the production of cast-iron.

The drying of the prepared lumps may be made by exposure to the air, or facilitated by the application of artificial heat.

It is the design that the composite material shall contain a sufficient quantity of lime for fluxing; but if the proper consolidation requires more lime than is necessary for the flux, then additional pure oxide of iron may be introduced into the furnace.

I claim—

1. The method herein described of making cast-iron from oxides of iron by reducing magnetic iron ores to a fine or powdered condition, separating the iron oxides therefrom by magnetic influence, and preparing and uniting the same for use in the furnace, whereby the products thereof are controlled by controlling the character of the material prior to its use in the furnace, substantially as herein described.

2. The consolidation of purified fine magnetic oxides of iron with lime, or its equivalent, in the manufacture of cast-iron, in the manner and for the purposes substantially as herein described.

3. A composite material of purified fine magnetic oxides of iron and lime, prepared as described, to furnish both the material and its flux in the same combination.

4. As a new article of commerce and trade, a composite material for the production of iron, having the character of fine purified oxides of iron, compounded with lime or its equivalent.

Witnesses:    WILLIAM J. TAYLOR.

A. E. H. JOHNSON,
  J. W. HAMILTON JOHNSON.